(12) United States Patent
Ogino et al.

(10) Patent No.: US 10,133,441 B2
(45) Date of Patent: Nov. 20, 2018

(54) ELECTRONIC APPARATUS AND METHOD

(71) Applicant: KABUSHIKI KAISHA TOSHIBA, Minato-ku, Tokyo (JP)

(72) Inventors: Toshihiko Ogino, Hamura Tokyo (JP); Takahiro Takimoto, Sayama Saitama (JP); Tadashi Kubo, Ome Tokyo (JP)

(73) Assignee: KABUSHIKI KAISHA TOSHIBA (JP)

( * ) Notice: Subject to any disclaimer, the term of this patent is extended or adjusted under 35 U.S.C. 154(b) by 0 days.

(21) Appl. No.: 15/362,539

(22) Filed: Nov. 28, 2016

(65) Prior Publication Data
US 2017/0153789 A1 Jun. 1, 2017

Related U.S. Application Data

(60) Provisional application No. 62/261,219, filed on Nov. 30, 2015.

(51) Int. Cl.
*G06F 3/0481* (2013.01)
*G06F 3/0484* (2013.01)
*G06K 9/00* (2006.01)
*G06K 9/78* (2006.01)
*G06F 3/01* (2006.01)
*G06F 3/0485* (2013.01)

(52) U.S. Cl.
CPC .......... *G06F 3/04815* (2013.01); *G06F 3/011* (2013.01); *G06F 3/017* (2013.01); *G06F 3/0485* (2013.01); *G06F 3/04845* (2013.01); *G06K 9/00355* (2013.01); *G06K 9/78* (2013.01)

(58) Field of Classification Search
None
See application file for complete search history.

(56) References Cited

U.S. PATENT DOCUMENTS

| 2009/0228841 | A1 | 9/2009 | Hildreth | |
|---|---|---|---|---|
| 2010/0115455 | A1* | 5/2010 | Kim | G06F 3/04815 715/781 |
| 2011/0117958 | A1* | 5/2011 | Kim | G03B 35/10 455/556.1 |
| 2012/0249741 | A1* | 10/2012 | Maciocci | G06F 3/011 348/46 |

FOREIGN PATENT DOCUMENTS

| JP | 2011-517357 | 6/2011 |
|---|---|---|
| JP | 5558899 B2 | 7/2014 |
| JP | 2015-075781 | 4/2015 |

* cited by examiner

*Primary Examiner* — Said Broome
(74) *Attorney, Agent, or Firm* — Rutan & Tucker, LLP

(57) ABSTRACT

According to one embodiment, an electronic apparatus includes a hardware processor. The hardware processor is configured to display a first three-dimensional object and a second three-dimensional object on a display, spectroscopically display a first user interface if the first three-dimensional object is selected, rotate the first three-dimensional object and the first user interface through a first angle corresponding to changes in positions of hands of the user, spectroscopically display a second user interface if the first and second three-dimensional objects are selected, and rotate the first and second three-dimensional objects and the second user interface through a second angle corresponding to changes in the positions of hands of the user.

13 Claims, 9 Drawing Sheets

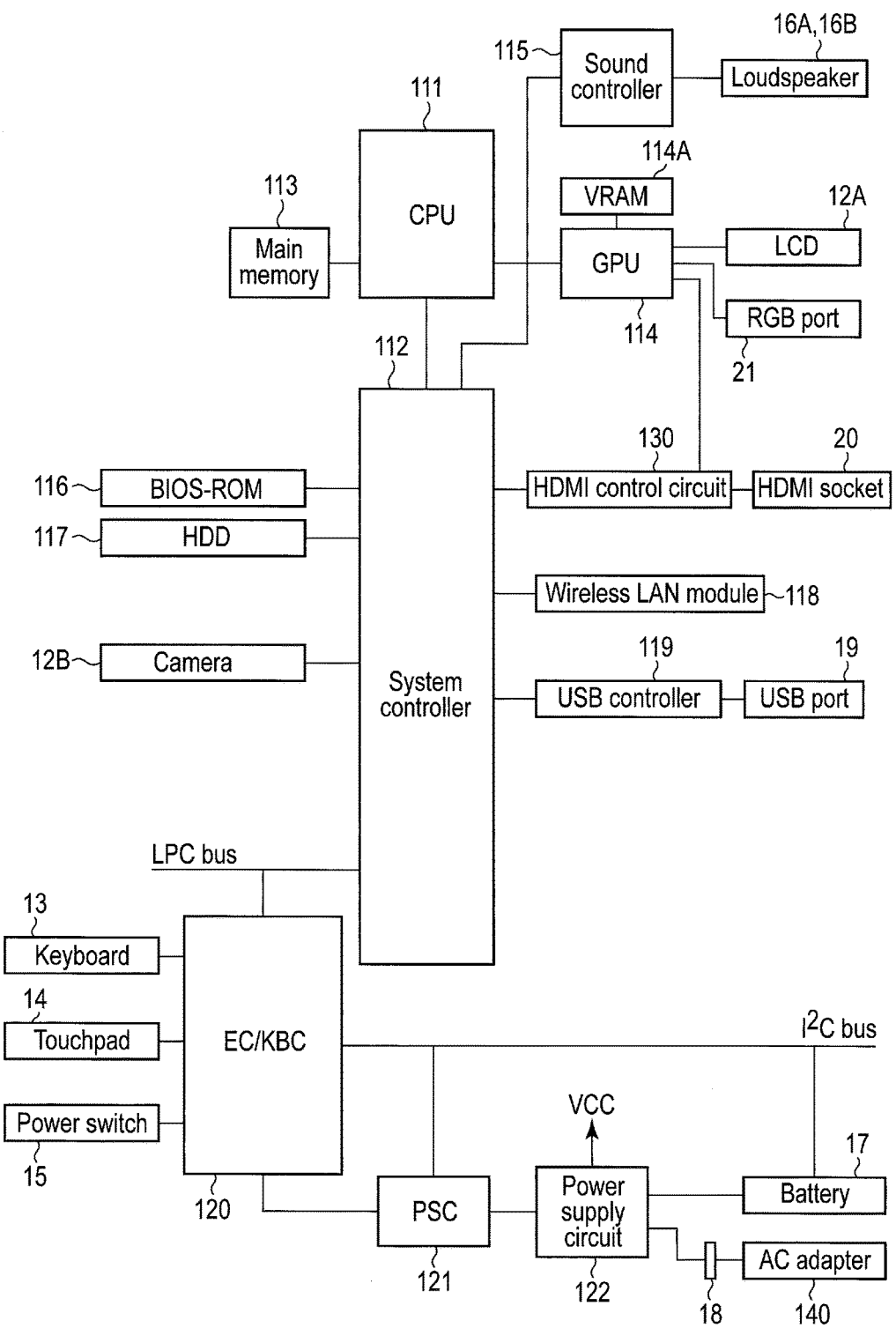
F I G. 2

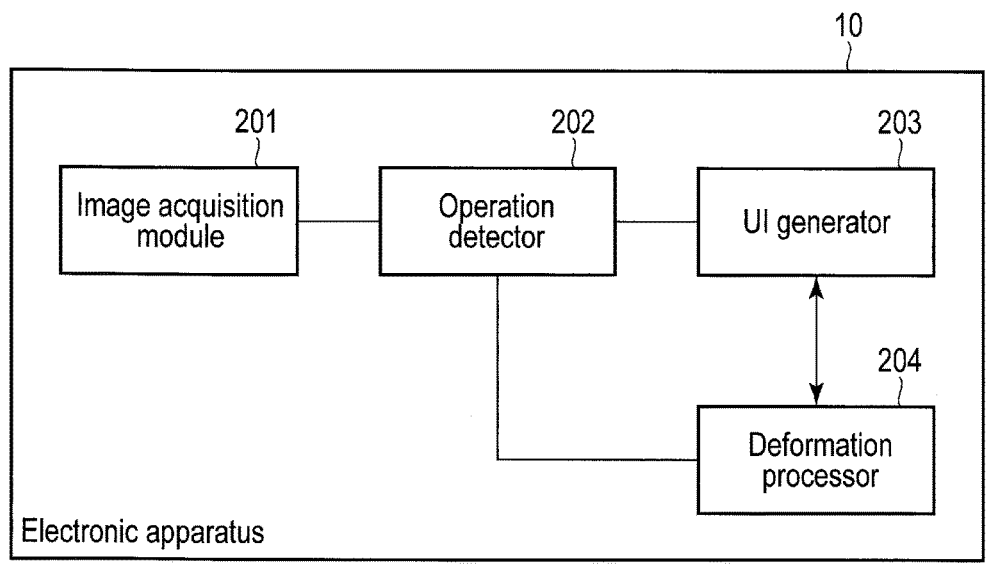
F I G. 3
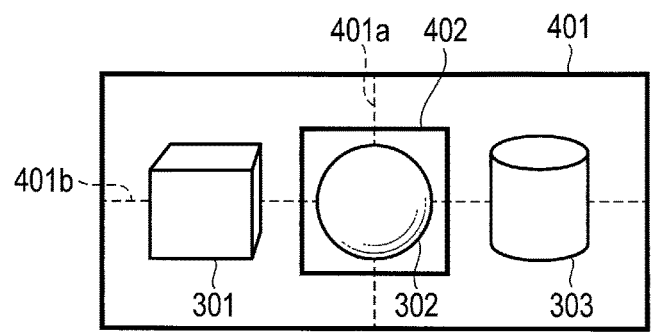
F I G. 5

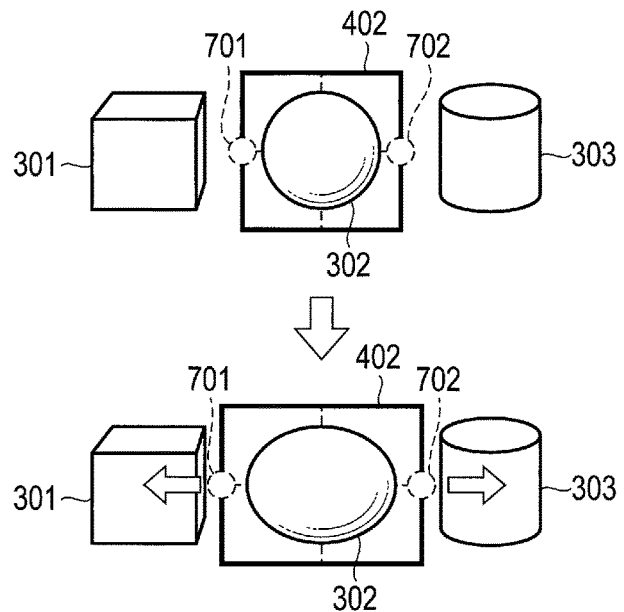
F I G. 9
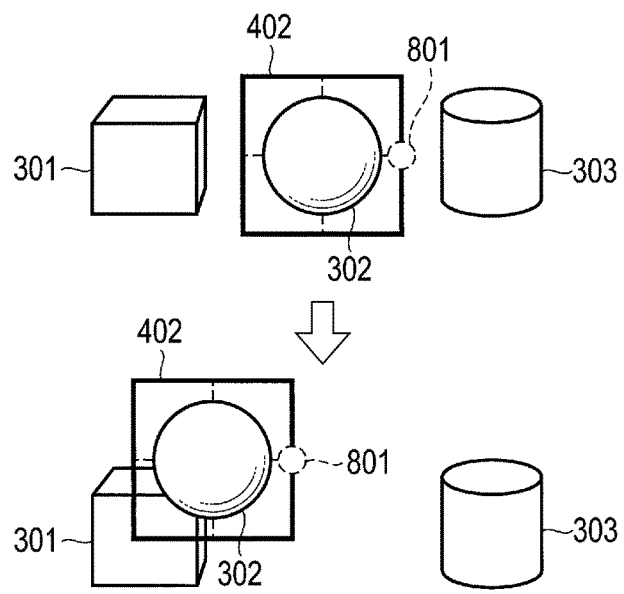
F I G. 10

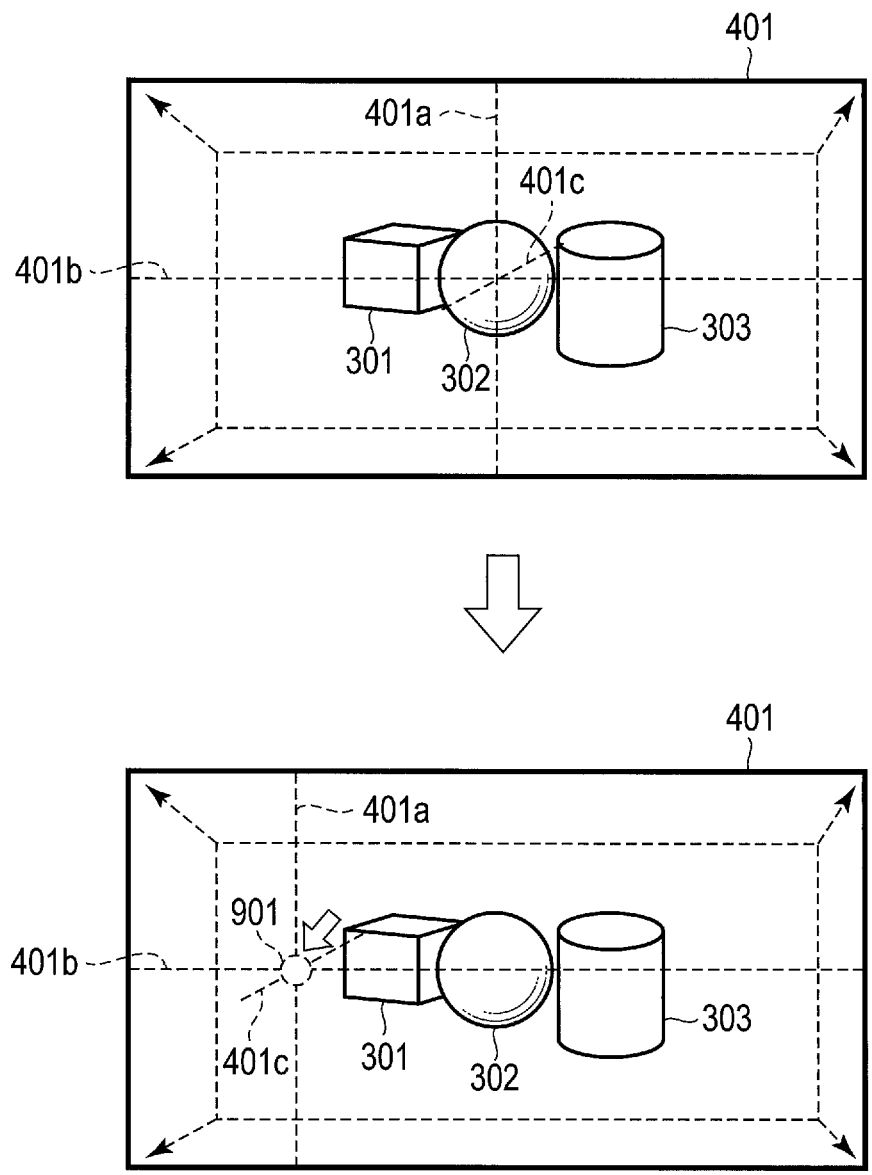
F I G. 11

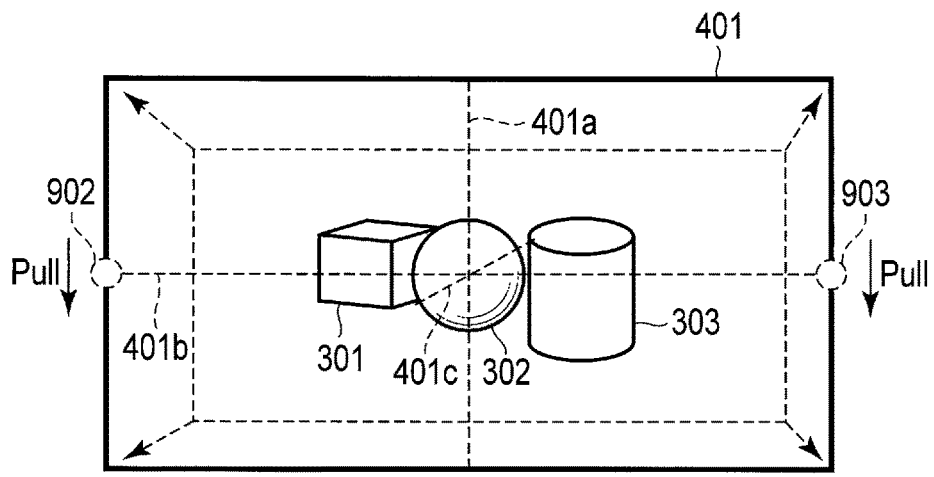
F I G. 12
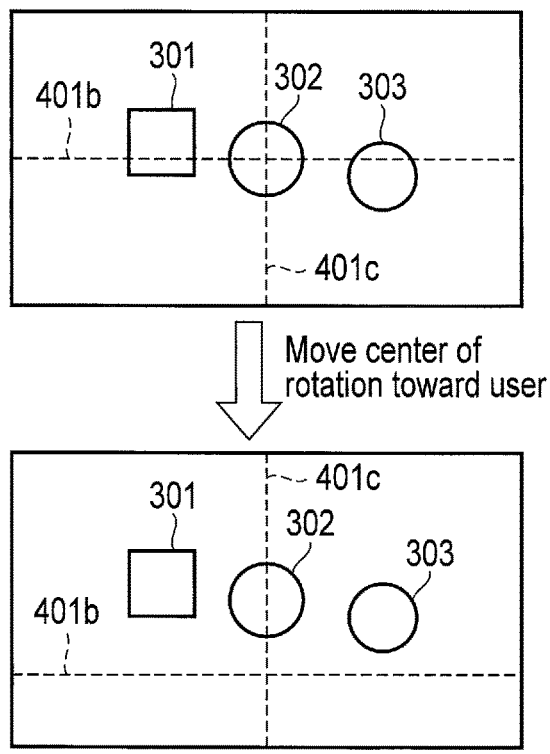
F I G. 13

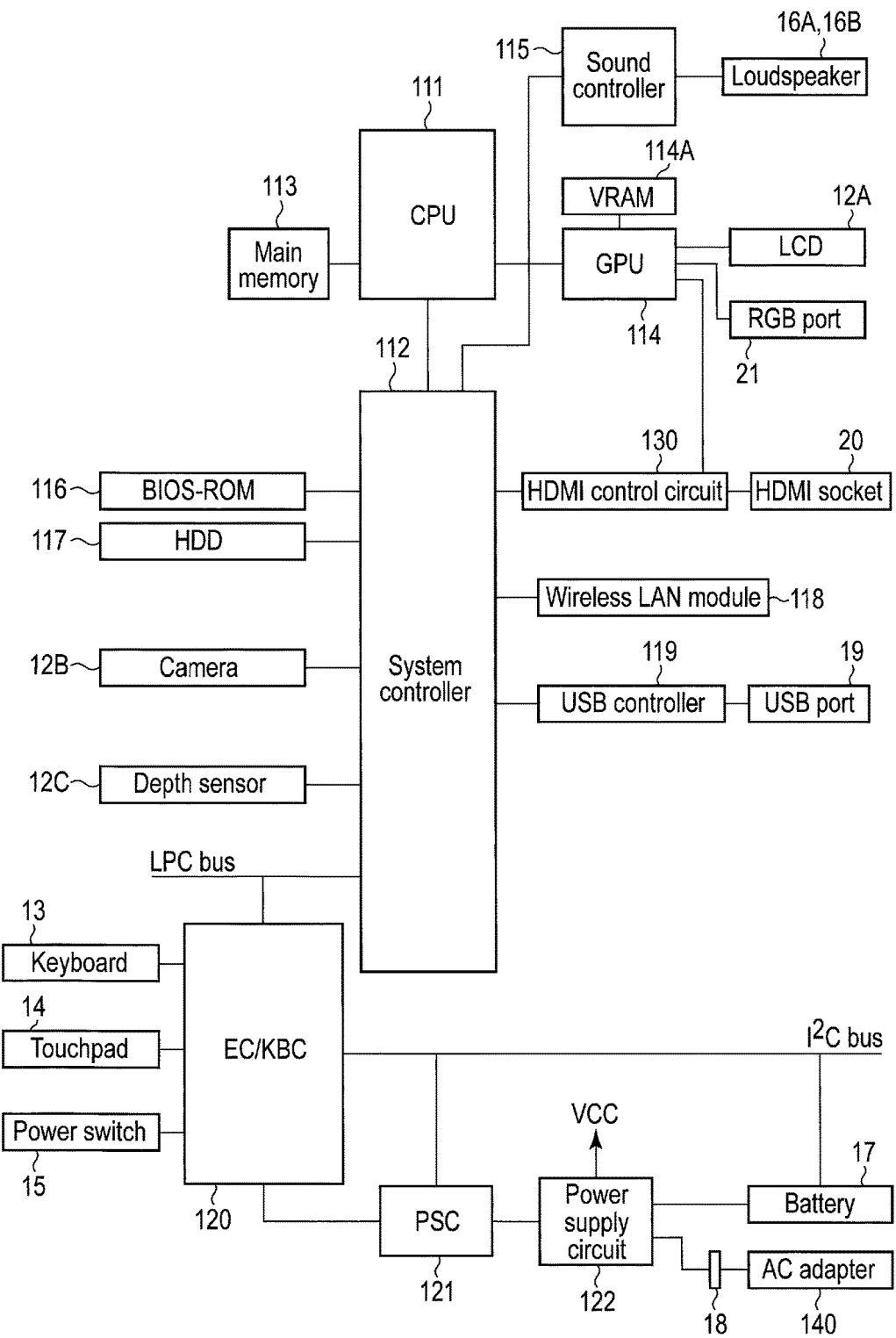
F I G. 14

ELECTRONIC APPARATUS AND METHOD

CROSS-REFERENCE TO RELATED APPLICATIONS

This application claims the benefit of U.S. Provisional Application No. 62/261,219, filed Nov. 30, 2015, the entire contents of which are incorporated herein by reference.

FIELD

Embodiments described herein relate generally to an electronic apparatus and a method.

BACKGROUND

Electronic apparatuses, such as notebook and desktop computers (PC) and digital televisions, are well known.

In recent years, such electronic apparatuses have come to employ a display panel (3D display) corresponding to 3D display, whereby cases where a three-dimensional object (hereinafter, referred to as a 3D object) is stereoscopically displayed have increased in the fields of healthcare, computer-aided design (CAD), video editing, etc.

In these fields, there are many cases where it is necessary to rotate a 3D object stereoscopically displayed on a 3D display, in order to see (observe) the object in detail from various angles.

Therefore, there is a demand for a technique of enabling an operation (via a user interface) of rotating such a 3D object to be intuitive and easy.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing a system configuration example of the electronic apparatus.

FIG. 3 is a block diagram view showing a functional configuration example of the electronic apparatus.

FIG. 5 is a view for explaining a macroframe UI and a microframe UI.

FIG. 9 is a view for explaining an example of an enlargement/reduction operation.

FIG. 10 is a view for explaining an example of a moving operation.

FIG. 11 is a view for explaining an example of a user operation performed to change the center of rotation.

FIG. 12 is a view for explaining an example of an operation of adjusting the depth-wise position of the center of rotation.

FIG. 13 is a view for explaining an example of a result of the operation of adjusting the depth-wise position of the center of rotation.

FIG. 14 is a block diagram showing a system configuration example of an electronic apparatus provided with a depth sensor.

DETAILED DESCRIPTION

Various embodiments will be described hereinafter with reference to the accompanying drawings.

In general, according to one embodiment, an electronic apparatus includes a display configured to display a three-dimensional object, a camera configured to capture an image including hands of a user, and a hardware processor. The hardware processor is configured to display a first three-dimensional object and a second three-dimensional object on the display, spectroscopically display a first user interface of a rectangular shape surrounding the first three-dimensional object, if the first three-dimensional object is selected, rotate the first three-dimensional object and the first user interface through a first angle corresponding to changes in positions of hands of the user that occur when the first user interface is displayed, spectroscopically display a second user interface of a rectangular shape surrounding the first and second three-dimensional objects, if the first and second three-dimensional objects are selected, and rotate the first and second three-dimensional objects and the second user interface through a second angle corresponding to changes in the positions of hands of the user that occur when the second user interface is displayed.

Figure 1:
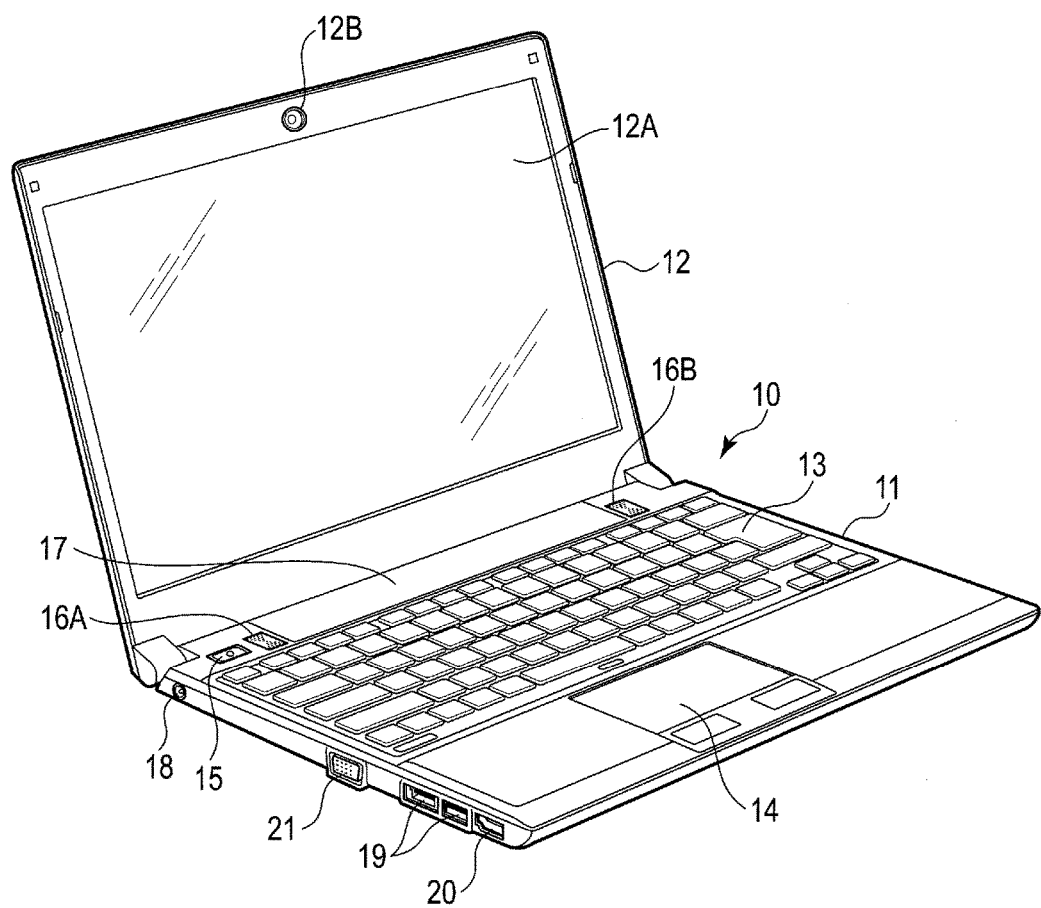
FIG. 1 is a perspective view showing an appearance example of an electronic apparatus according to an embodiment.

FIG. 1 is a perspective view showing the appearance of an electronic apparatus according to the embodiment. This electronic apparatus may be realized as an arbitrary electronic apparatus equipped with a display, such as a notebook computer used by a user. In FIG. 1, it is assumed that the electronic apparatus is realized as, for example, a notebook computer. In the description below, the electronic apparatus of the embodiment is assumed to be realized as the notebook computer.

As shown in FIG. 1, the electronic apparatus 10 includes a main body 11 (computer main body), and a display unit 12.

The main body 11 has a thin-box-shaped housing. The display unit 12 is attached to the main body 11 so that it is rotatable between an operation position in which the upper surface of the main body 11 is exposed, and a closed position in which the upper surface of the main body 11 is covered with the display unit 12.

The display unit 12 incorporates a display (hereinafter, referred to as a 3D display) 12A capable of displaying, for example, a plurality of three-dimensional objects (hereinafter, referred to as 3D objects). The 3D display 12A includes a liquid crystal display (LCD) and a lens unit (not shown). The lens unit is pasted on the LCD. The lens unit includes a plurality of lens mechanisms for projecting, in respective predetermined directions, a plurality of structures corresponding to a plurality of pixels contained in an image (3D object) displayed on the LCD. By displaying an image for the left eye and an image for the right eye on the 3D display 12A, the user can perceive a 3D object. The 3D display 12A may be configured to be able to switch display between a 3D object and a 2D (two-dimensional) object.

Assume that the 3D display 12A adopts, for example, a naked-eye stereoscopic vision scheme (for example, an integral imaging scheme, a lenticular scheme, a parallax barrier scheme, etc.). In the naked-eye stereoscopic vision scheme, an image for the left eye and an image for the right eye, which correspond to a 3D object, are displayed in certain positions on the 3D display 12A. The naked-eye stereoscopic vision scheme enables the user to perceive a 3D object with their naked eyes.

For display of a 3D object, a shutter scheme (time division system), for example, may be adopted. In the display of a 3D object in the shutter system, stereo pair images including image data for the left eye and image data for the right eye are used. For instance, the LCD is driven at a refresh rate (for example, 120 Hz) twice the normal refresh rate (for example, 60 Hz). Frames for the left eye included in the image data for the left eye, and frames for the right eye included in the image data for the right eye are alternately displayed on the LCD at, for example, the 120-Hz refresh rate. 3D glasses (not shown), such as liquid crystal shutter glasses, enable the user to see, with the left eye, images corresponding to the frames for the left eye, and to see, with the right eye, images corresponding to the frames for the right eye. The 3D glasses may be configured to receive, from the electronic apparatus 10, synchronization signals indicating the display times of the left-eye frames and the right-eye frames, using, for example, infrared rays. A shutter for the left eye and a shutter for the right eye in the 3D glasses are opened and closed in synchronism with the respective display times of the left-eye frames and the right-eye frames.

Furthermore, a polarization system, such as an Xpol (registered trademark) system, may be used for the display of a 3D object. In this case, a group of interleave frames obtained by, for example, interleaving images for the left eye and images for the right eye scanning line by scanning line is generated and displayed on the LCD. A polarization filter covering the screen of the LCD polarizes, in different directions, images for the left eye displayed at, for example, lines of odd numbers on the screen of the LCD and images for the right eye displayed thereon at lines of even numbers. The polarized glasses enable the user to see the images for the left eye with the left eye, and the images for the right eye with the right eye.

A camera 12B is provided on the upper portion of the display unit 12. More specifically, the camera 12B is located on, for example, the front surface of the electronic apparatus 10, where the user of the electronic apparatus 10 can be imaged. The camera 12B has a function of three-dimensionally imaging, for example, the motion of both the hands and fingers of the user.

A keyboard 13, a touchpad 14, a power switch 15 for turning on and off the electronic apparatus 10, loudspeakers 16A and 16B, etc., are arranged on the upper surface of the main body 11.

Further, the electronic apparatus 10 is configured to receive electric power from a battery 17. In the example of FIG. 1, the battery 17 is built in the electronic apparatus 10.

A power supply connector (DC power supply input socket) 18 is provided in the main body 11. More specifically, the power supply connector 18 is provided at a side, for example, the left-hand side, of the main body 11. An external power supply unit is detachably connected to the power supply connector 18. An AC adapter can be used as the external power supply unit. The AC adapter is a power supply unit that converts commercial electric power (AC power) into DC power.

The electronic apparatus 10 is powered by electric power supplied from the battery 17 or from an external power supply unit. If no external power supply unit is connected to the power supply connector 18 of the electronic apparatus 10, the electronic apparatus 10 is powered by the electric power supplied from the battery 17. In contrast, if the external power supply unit is connected to the power supply connector 18 of the electronic apparatus 10, the electronic apparatus 10 is powered by the electric power supplied from the external power supply unit. The electric power supplied from the external power supply unit is also used to charge the battery 17.

A plurality of USB ports 19, a High-definition Multimedia Interface (HDMI) (registered trademark) output socket 20, and an RGB port 21, for example, are further provided in the main body 11.

FIG. 2 shows the system configuration of the electronic apparatus 10 of FIG. 1. As shown, the electronic apparatus 10 includes a CPU 111, a system controller 112, a main memory 113, a graphics processing unit (GPU) 114, a sound controller 115, a BIOS-ROM 116, a hard disk drive (HDD) 117, a wireless LAN module 118, a USB controller 119, an embedded-controller/keyboard-controller IC (EC/KBC) 120, a power supply controller (PSC) 121, a power supply circuit 122, etc.

The CPU 111 is a hardware processor configured to control the operation of each component in the electronic apparatus 10. The CPU 111 executes various computer programs loaded from a storage apparatus, such as the HDD 117, to the main memory 113. The computer programs include an operating system (OS), a program (hereinafter referred to as a UI program) for enabling the user to operate a 3D object, other application programs, etc.

The CPU 111 also executes a basic input/output system (BIOS) stored in the BIOS-ROM 116 as a nonvolatile memory. The BIOS is a system program for hardware control.

The system controller 112 is a bridge device configured to connect the CPU 111 to each component. The system controller 112 contains a Serial ATA controller for controlling the HDD 117. Furthermore, the system controller 112 communicates with each device on a Low Pin Count (LPC) bus.

The GPU 114 is a display controller configured to control the 3D display 12A (LCD) used as the display monitor of the electronic apparatus 10. The GPU 114 generates a display signal (LVDS signal) to be supplied to the LCD 12A, based on display data stored in, for example, a video memory (VRAM) 114A.

The GPU 114 can also generate an HDMI video signal and an analog RGB signal from the display data. The HDMI output socket 20 can send an HDMI video signal (non-compressed digital video signal) and a digital audio signal to an external display through a single cable. The analog RGB signal is supplied to the external display via the RGB port 21.

An HDMI control circuit 130 shown in FIG. 2 is an interface configured to send the HDMI video signal and the digital audio signal to the external display through the HDMI output socket 20.

The sound controller 115 is a sound source device, and outputs audio data as a reproduction target to, for example, loudspeakers 16A and 16B.

The wireless LAN module 118 is a module configured to execute wireless communication of, for example, the IEEE 802.11 standard.

The USB controller 119 communicates with an external device connected through the USB port 19.

The EC/KBC 120 is connected to the LPC bus. The EC/KBC 120 is interconnected to the PSC 121 and the battery 17 through a serial bus, such as an I²C bus.

The EC/KBC 120 is a power management controller configured to execute power management of the electronic apparatus 10. For example, it is realized as a single-chip microcomputer containing a keyboard controller for controlling the keyboard (KB) 13, the touchpad 14, etc. The EC/KBC 120 has a function of turning on and off the electronic apparatus 10 in accordance with a user operation of the power switch 15. On/off control of the electronic apparatus 10 is realized by the cooperation of the EC/KBC 120 and the PSC 121. Upon receiving an ON signal from the EC/KBC 120, the PSC 121 controls a power supply circuit 122 to turn on the electronic apparatus 10. Similarly, upon receiving an OFF signal from the EC/KBC 120, the PSC 121 controls the power supply circuit 122 to turn off the electronic apparatus 10.

The power supply circuit 122 generates electricity (operation power Vcc) to be supplied to each component, using electricity supplied from the battery 17 or from an AC adapter 140 connected as an external power supply unit to the main body 11.

The camera 12B shown in FIG. 1 is connected to the system controller 112. An image of an object imaged by the camera 12B is used to accept a user operation on the above-mentioned 3D object.

FIG. 3 shows the functional configuration of the electronic apparatus 10 according to the embodiment. As shown in FIG. 3, the electronic apparatus 10 includes an image acquisition module 201, an operation detector 202, a UI generator 203, and a deformation processor 204.

In the embodiment, assume that part or all of components 201 to 204 are realized by the CPU 111 executing the above-described UI program (software). Further, part or all of components 201 to 204 may be realized by hardware, such as an integrated circuit (IC), or may be realized as a combination of software and hardware.

The image acquisition module 201 acquires an image including an image of (the motion of) the user imaged by the above-mentioned camera 12B.

The operation detector 202 detects user operations (for example, motions of a user's hand or finger, etc.) based on a user motion included in the image acquired by the image acquisition module 201. The operation detected by the operation detector 202 includes, for example, an operation for displaying a user interface (which enables the user to operate a 3D object) provided by, for example, the UI program, and an operation on the user interface to deform a 3D object displayed on the 3D display 12A.

If the operation detector 202 has detected an operation for displaying the user interface, the UI generator 203 generates a user interface image to be displayed on the 3D display 12A. The user interface (image) generated by the UI generator 203 has a rectangular frame shape and is located around a 3D object currently displayed on the 3D display 12A. It is sufficient if the rectangular frame surrounding the 3D object includes at least four linear lines (solid and/or broken lines) positioned above, below, leftward and rightward of the 3D object. For instance, part of the four corners of the frame may be curved or may not exist. Moreover, it is sufficient if the user interface has a shape that can surround the 3D object, namely, for example, a round shape.

The user interface generated by the UI generator 203 is displayed (drawn) on the 3D display 12A in a stereoscopic manner. This enables the user to see, on the 3D display 12A, a 3D object and a rectangular user interface positioned around the object.

If the operation detector 202 has detected an operation on the user interface displayed (stereoscopically) on the 3D display 12A, the deformation processor 204 deforms a 3D object surrounded by (the rectangular frame of) the user interface in accordance with the operation. Specifically, the deformation processor 204 rotates, enlarges or reduces the 3D object.

The 3D object deformed by the deformation processor 204 is displayed (redrawn) on the 3D display 12A. That is, the user can deform the 3D object, currently displayed on the 3D display 12A, by operating the rectangular user interface.

Referring then to the flowchart of FIG. 4, a description will be given of the procedure of processing performed by the electronic apparatus 10 according to the embodiment.

Assume here that a plurality of 3D objects are displayed on the 3D display 12A, and the user operates the 3D objects.

In this case, the user can activate, for example, the camera 12B to thereby perform an operation (hereinafter, referred to as a first operation) of displaying a user interface on the 3D display 12A of the electronic apparatus 10. The first operation includes, for example, a user (using the electronic apparatus 10) motion of holding up their hand in front of the 3D display 12A (camera 12B).

Although in the embodiment, the user activates the camera 12B when performing the first operation, the camera 12B may always be activated while the electronic apparatus 10 is in the ON state. If the camera 12B is activated, the image acquisition module 201 continuously acquires images including motion of the user using the electronic apparatus 10 (namely, motion of the user positioned before the electronic apparatus 10). In the following description, images acquired by the image acquisition module 201 will be referred to as captured images.

First, the operation detector 202 detects the first operation based on a captured image (block B1). Specifically, the operation detector 202 detects the first operation if the user's hand (the palm of the hand) is included in the captured image (that is, the motion of holding up a hand is detected in the captured image).

After executing block B1, the UI generator 203 generates a rectangular user interface (hereinafter, referred to as a macroframe UI) surrounding a plurality of 3D objects currently displayed on the 3D display 12A. The macroframe UI generated by the UI generator 203 is spectroscopically displayed (drawn) on the 3D display 12A so that it overlaps a plurality of 3D objects in the same space (block B2). The macroframe UI may have the same size as, for example, the 3D display 12A, or may be smaller than the 3D display 12A. It is sufficient if the macroframe has a size sufficient to enclose the plurality of 3D objects.

Next, the UI generator 203 generates a rectangular user interface (hereinafter, referred to as a microframe UI) surrounding one of the above-mentioned 3D objects displayed on the 3D display 12A. The microframe UI generated by the UI generator 203 is spectroscopically displayed (drawn) on the 3D display 12A so that it overlaps its surrounding 3D object in the same space (block B3). It is sufficient if the microframe has a size that allows only one 3D object to be surrounded, and does not allow the other 3D objects to be surrounded.

In the embodiment, the position of a user's hand relative to a plurality of 3D objects displayed on the 3D display 12A can be detected, based on, for example, the position and size of the hand of a user included in a captured image (an image imaged by the camera 12B). The detected position of the user's hand includes the horizontal, vertical and depth-wise positions (namely, the three-dimensional positions) of the camera 12B. Thus, it is assumed that the 3D object surrounded by the microframe UI displayed in block B3 is determined, based on the display positions of the 3D objects and the position of the user's hand in the first operation.

Specifically, the UI generator 203 generates and draws a microframe UI, which surrounds a 3D object displayed in a position closest to the position of the user's hand detected as described above, of a plurality of 3D objects currently displayed on the 3D display 12A.

Specific examples of display modes of the macroframe and microframe UIs displayed in blocks B2 and B3 will be described later.

If the macroframe and microframe UIs are displayed in blocks B2 and B3, the user can select a 3D object as an operation target by moving their own hand.

In this case, the operation detector 202 detects the position of the user's hand relative to the 3D object, based on the captured image as described above (block B4).

The operation detector 202 selects (determines) a 3D object as an operation target, based on the detected position of the user's hand (block B5).

Specifically, in block B5, if, for example, a user's hand has been detected to be in a position for designating one of a plurality of 3D objects (position in which, for example, the hand overlaps the one 3D object) (more specifically, if such a motion of the hand as pointing the one 3D object has been detected), the operation detector 202 selects the 3D object. In contrast, if, for example, a user's hand is not in a position for designating one of the 3D objects (if, for example, the user has made such a motion as pointing something other than the 3D objects), the operation detector 202 selects the plurality of 3D objects (namely, all 3D objects displayed on the 3D display 12A).

It is assumed that if a 3D object other than the 3D object surrounded by the microframe UI displayed in block B3 is selected, the microframe UI is hidden, and another microframe UI that surrounds the selected 3D object is newly displayed. That is, the 3D object surrounded by the microframe UI can be changed by moving a user's hand to a position for designating a desired 3D object.

In the description below, the 3D object selected in block B5 will be referred to as a selected object, and the UI (the macroframe or microframe UI) that surrounds the selected object will be referred to a selected UI.

Next, the operation detector 202 determines whether the user has made an operation (hereinafter, referred to as a second operation) of holding the selected UI or a similar operation, based on the captured image (block B6). In block B6, the second operation is determined to have been performed, if it is detected from the captured image that, for example, both the user's hands are positioned in positions corresponding to rectangular frames that substantially oppose each other with a surface formed by the selected UI (hereinafter, referred to as a selected-UI formed surface) interposed therebetween.

The description below includes, for example, a sentence "the user holds a UI (macroframe or microframe UI)." This sentence indicates a state where both the user's hands are (estimated to be) in positions substantially corresponding to positions on a UI (a rectangular frame UI) that oppose each other with the aforementioned spectroscopically displayed UI-forming surface interposed therebetween.

If it is determined that the second operation has been performed (YES in block B6), the UI generator 203 changes the color of the selected UI in order to inform the user that the second operation has been performed (that is, the second operation on the selected UI has been detected) (block B7). Instead of this processing, in block B7, the shape of the selected UI may be changed, or a mark indicating that the second operation has been detected may be displayed. It is sufficient if the detection of the second operation can be informed to the user.

In addition, in order to enhance the visibility of the selected UI and the selected object, the UI (namely, the UI not selected in block B5) other than the selected one may be hidden after the second operation is detected.

Next, the user can perform an operation (hereinafter, referred to as a third operation) on the selected UI for deforming the selected object. The third operation includes, for example, an operation of rotating the selected object (hereinafter, referred to as a rotational operation), and an operation of enlarging or reducing the selected object (hereinafter, referred to as an enlargement/reduction operation). Specific examples of the rotational operation and the enlargement/reduction operation will be described later.

In this case, the operation detector 202 detects (acquires) a change in the position of the user's hand within a period in which the select UI is displayed, based on the captured image (block B9). The change in the position of the user's hand is expressed by, for example, three-dimensional coordinate values.

Next, the operation detector 202 determines whether the third operation has been performed based on changes in the detected positions of both of the user's hands (block B10).

If it is determined that no third operation is performed (NO in block B10), the processing of block B12, which will be described later, is performed.

In contrast, if it is determined that the third operation has been performed (YES in block B10), the deformation processor 204 deforms the selected object and the selected UI based on the third operation (i.e., based on changes in both of the user's hands), and displays (draws) the resultant figures on the 3D display 12A (block B11).

If the third operation is a rotational operation, the selected object and the selected UI are rotated about the center of rotation to be displayed, described later. At this time, the rotational angle of the selected object and the selected UI is computed (determined) based on changes in the positions of both of the user's hands in the rotational operation.

In contrast, if the third operation is an enlargement/reduction operation, the selected object and the selected UI are enlarged or reduced to be displayed. At this time, the enlargement or reduction ratio of the selected object and the selected UI is computed (determined) based on changes in the positions of both the user's hands in the enlargement/reduction operation.

Next, the operation detector 202 determines whether an operation of removing the user's hands from the selected UI (hereinafter, referred to as a fourth operation) has been performed, based on the captured image (block B12). In block B12, if it is detected based on the captured image that, for example, both the user's hands are deviated (separated) from positions substantially corresponding to positions on the selected UI (of a rectangular shape) that oppose each other with the selected UI interposed therebetween, it is determined that the fourth operation has been performed.

If it is determined that the fourth operation has been performed (YES in block B12), the UI generator 203 cancels change of the color of the UI (returns, to the original color, the color of the UI changed) in block B7, in order to inform the user that the fourth operation has been performed (that is, the fourth operation on the selected UI has been detected) (block B13).

After executing block B13, the procedure is repeated from block B4.

In contrast, if it is determined in block B12 that the fourth operation has not been performed (NO in block B12), the procedure is repeated from block B9. In this case, the user can continuously perform an operation for deforming the selected object (namely, the third operation).

If it is determined in block B6 that the second operation has not been performed (NO in block B6), the user can perform an operation for hiding the user interfaces (the macroframe and macroframe UIs) (hereinafter, referred to as a fifth operation). The fifth operation includes an operation of lowering a user's hand (that is, an operation of moving the user's hand to the outside of the imaging area of the camera 12B).

In this case, the operation detector 202 determines, based on the captured image, whether the fifth operation has been performed (block B14).

If it is determined that the fifth operation has been performed (YES in block B14), the macroframe and microframe UIs currently displayed on the 3D display 12A are hidden (block B15). After executing block B15, the procedure is finished.

In contrast, if it is determined that the fifth operation has not been performed (NO in block B14), the procedure is repeated from block B4.

Figure 4:
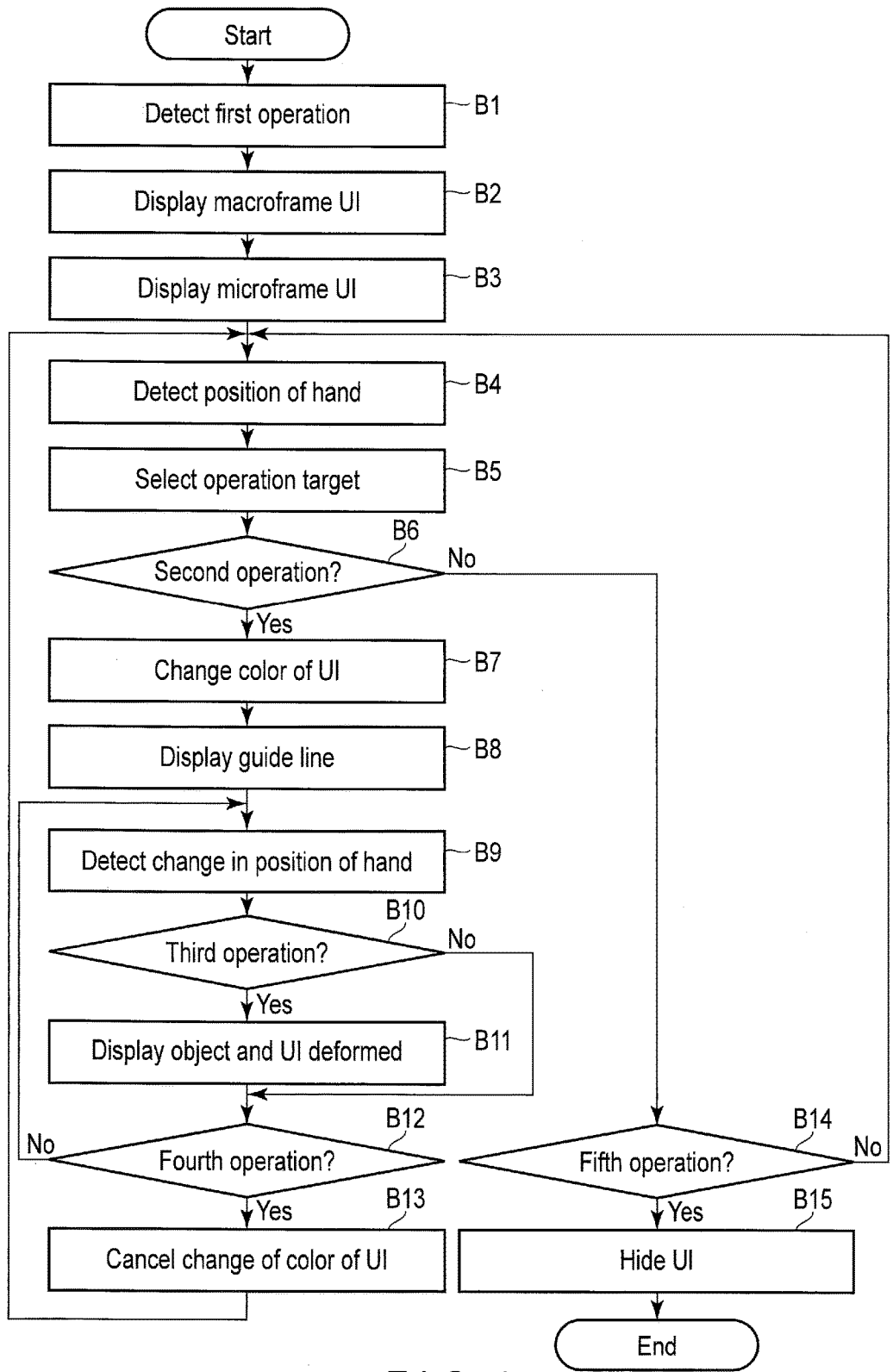
FIG. 4 is a flowchart showing an example of a procedure of processing by the electronic apparatus.

In the example of FIG. 4, the macroframe and microframe UIs are displayed in blocks B2 and B3 after the first operation is detected in block B1. However, this structure may be modified such that, for example, after a 3D object is selected in block B5, a UI (macroframe or microframe UI) that surrounds the selected 3D object is displayed. In this modification, if, for example, block B4 and subsequent blocks are repeated after block B13, the macroframe and microframe UIs may be once hidden.

Moreover, if the first operation is performed with both hands (that is, the user holds up both hands), the macroframe UI may be displayed, using, as a default, a state where a plurality of 3D objects are selected. In contrast, if the first operation is performed by one hand of the user, a microframe UI may be displayed, using, as a default, a state where a single 3D object is selected.

Further, in the processing of FIG. 4, the second operation is performed after an operation target (a 3D object as the operation target) is selected in block B5. This structure may be modified such that the operation target is selected by the second operation. In this case, if the user has performed an operation of holding the macroframe or microframe UI (second operation) in a state where the macroframe and microframe UIs are displayed, it is sufficient if block B7 and subsequent blocks are executed using, as the operation target, a 3D object surrounded by a UI on which the operation has been performed.

Referring then to FIG. 5, a description will be given of the macroframe and microframe UIs displayed in blocks B2 and B3. In the example shown in FIG. 5, 3D objects 301 to 303 are supposed to be displayed as the plurality of 3D objects on the 3D display 12A.

In this case, as shown in FIG. 5, a macroframe UI 401 that includes (surrounds) all 3D objects 301 to 303 displayed on the 3D display 12A is displayed on the 3D display 12A. Further, a microframe UI 402 that includes (surrounds) 3D object 302 is displayed on the 3D display 12A. 3D object 302 included by the microframe UI 402 is a 3D object closest, among 3D objects 301 to 303, to the position of a user's hand in the first operation.

In FIG. 5, although the macroframe and microframe UIs 401 and 402 are rectangular, they may have a shape (such as a circular shape) other than the rectangular shape.

In the embodiment, 3D objects 301 to 303 surrounded by the macroframe UI 401 can be, for example, rotated in accordance with a user operation (rotational operation) on the macroframe UI 401, as described above. In this case, 3D objects 301 to 303 are rotated about the aforementioned center of rotation. To this end, in the macroframe UI 401 (namely, in the rectangular frame of the user interface), axial lines indicating the center of rotation, which are used as reference lines to be referred to for rotating 3D objects 301 to 303 surrounded by the frame UI 401, are displayed. The axial lines displayed in the macroframe UI 401 include a horizontal axial line 401a, a vertical axial line 401b and a depth-wise axial line. In the embodiment, the intersection of these axial lines expresses the center of rotation. In FIG. 5, the depth-wise axial line is omitted for convenience.

By the display of the axial lines in the macroframe UI 401, the user can easily grasp the center of rotation of 3D objects 301 to 303. In addition, it is assumed that the center of rotation is set, as a default, at the center of the macroframe UI 401 (namely, at the center of the space defined by the rectangular frame).

Although omitted in FIG. 5, the above-mentioned axial lines are assumed to be also displayed in each microframe UI 402.

The axial lines may be displayed when the macroframe and microframe UIs are displayed on the 3D display 12A in blocks B2 and B3, or may be displayed before the user performs a rotational operation (for example, after the processing of block B7).

Figure 6:
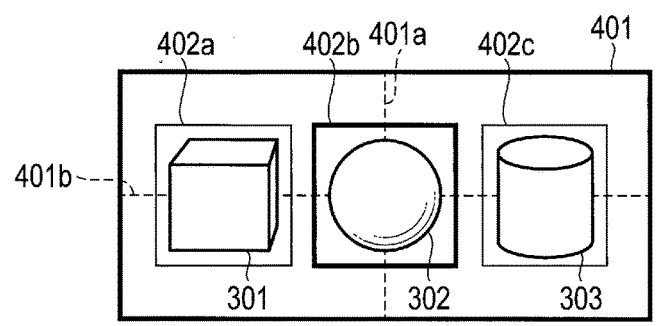
FIG. 6 is a view showing display examples of microframe UIs that include respective 3D objects.

Further, although in FIG. 5, it is assumed that only one microframe UI is displayed, a plurality of microframes 402a to 402c respectively surrounding 3D objects 301 to 303 may be displayed, for example, as is shown in FIG. 6. For instance, if 3D object 302 is selected in block B5 shown in FIG. 4, microframe UI 402b is made to be discriminated from the other UIs (i.e., macroframe UI 401 and microframe UIs 402a and 402c) by changing the color of microframe UI 402b surrounding 3D object 302.

If only one microframe UI is displayed as shown in FIG. 5, the 3D object surrounded by this microframe UI can be changed (selected) by moving, as described above, a user's hand to a position for designating a 3D object. Furthermore, in the embodiment, the depth-wise position (used as depth data) of a user's hand can be detected based on an captured image, as described above.

Figure 7:
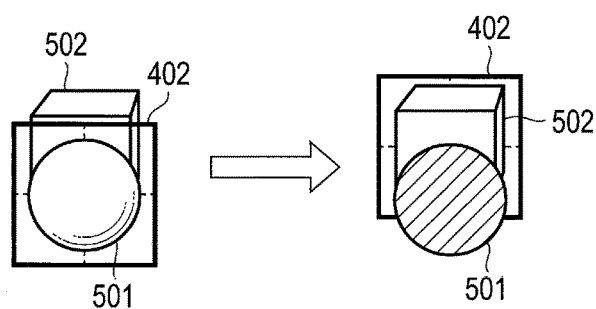
FIG. 7 is a view for explaining a microframe UI in a situation where two 3D objects overlap.

Accordingly, even if, for example, two 3D objects 501 and 502 overlap each other as shown in FIG. 7, it can be detected that the user has moved their hand to a position for designating 3D object 501 or 502, by comparing the display positions of 3D objects 501 and 502 with the depth-wise position of the user's hand.

As a result, in a case where microframe UI 402 surrounding 3D object 501 is displayed, if the user has moved their hand to a position deeper (i.e., toward the 3D display 12A) than microframe UI 402 (or 3D object 501), microframe UI 402 surrounding 3D object 502 can be displayed. In other words, the 3D object surrounded by microframe UI 402 can be changed from 3D object 501 to 3D object 502.

Further, if another 3D object 501 overlaps 3D object 502, surrounded by microframe UI 402, in front of 3D object 502 as shown in FIG. 7, it may be displayed in a see-through way in order to raise the visibility of 3D object 502.

Figure 8:
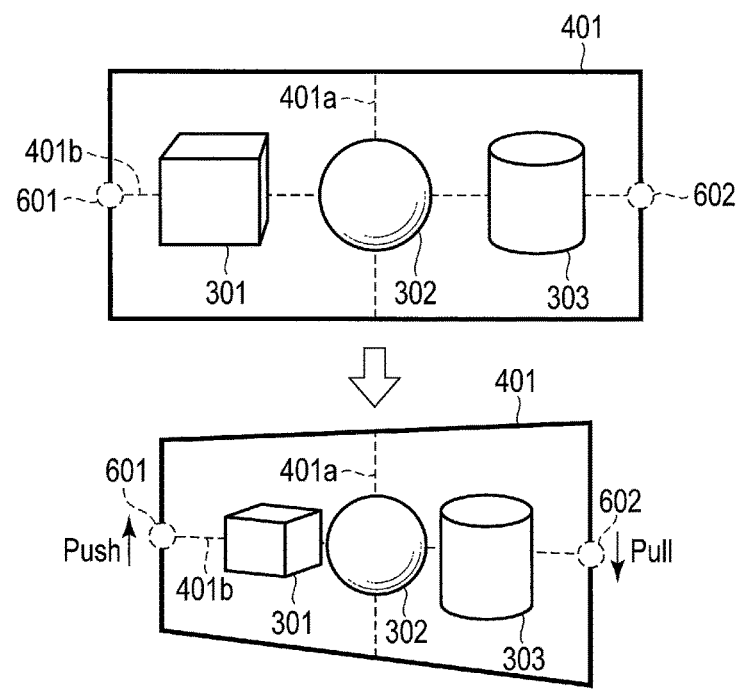
FIG. 8 is a view for explaining an example of a rotational operation.

Referring then to FIG. 8, the rotational operation included in the third operation will be described in detail. Assume here that the macroframe UI 401 is a selected UI.

As is described referring to FIG. 4, the user performs the second operation (in this case, such an operation as holding ends of the macroframe UI 401) before the rotational operation (third operation). Accordingly, if the rotational operation is performed, it is assumed that both of the user's hands are in positions 601 and 602 corresponding to positions on (the rectangular shape of) the macroframe UI 401 that substantially oppose each other with the forming surface of the macroframe UI 401 interposed therebetween, as is shown in the upper portion of FIG. 8.

In this state, it is assumed that the operation detector detects the rotational operation when detecting that one of the user's hands (for example, the left hand) has been moved in a direction not parallel to the forming surface of the macroframe UI 401 (for example, the depth direction), and the other hand (for example, the right hand) of the user's hands has been moved in a direction (for example, toward the front) opposite to the first-mentioned direction (more specifically, when detecting changes in the positions of the user's hands corresponding to the above-mentioned movements of the left and right hands). Conceptually, if such an operation as pushing one of the user's hands holding (the rectangular shape of) the macroframe UI 401, and pulling the other hand is detected, the rotational operation is detected.

If such a rotational operation is detected, 3D objects (selected objects) 301 to 303 and the macroframe UI 401 (namely, the entire space defined by the macroframe UI 401) can be rotated about, for example, axial line 401*a* as a rotation axis at an angle corresponding to the changes in the positions of the user's hands caused by the rotational operation to be displayed, as is shown in the lower portion of FIG. 8.

Moreover, in the example of FIG. 8, the user holds, using both hands, positions 601 and 602 on the macroframe UI 401. However, the positions in which the user holds the macroframe UI 401 are not limited to positions on the left and right sides of the macroframe UI 401. They may be positions on the upper and lower sides of the macroframe UI 401. That is, if, for example, such an operation (rotational operation) as depth-wise pushing one of the user's hands holding the upper and lower sides of the macroframe 401, and pulling the other hand is detected, 3D objects 301 to 303 and the macroframe UI 401 can be rotated about, for example, axial line 401*b* as a rotation axis to be displayed.

The rotation of the 3D objects is not limited to those about axial lines 401*a* and 401*b* as the rotation axes, but can be three-dimensionally rotated in an arbitrary direction with respect to the centers of rotation indicated by the axial lines.

It is sufficient if the hands of the user are in positions where changes in the positions of the hands of the user can be detected for detecting the above-mentioned rotational operation. For instance, the positions are not limited to those opposing each other with the forming surface of the macroframe UI 401 interposed therebetween. More specifically, if, for example, the macroframe UI 401 is of a rectangular shape, the positions of the user's hands may be on adjacent sides or a single side of (the rectangular shape of) the macroframe UI 401.

Although FIG. 8 is directed to the case where the selected UI is the macroframe UI 401, the rotational operation can be also performed if the selected UI is the microframe UI 402.

Referring now to FIG. 9, a detailed description will be given of the enlargement/reduction operation included in the above-described third operation. Assume here that the microframe UI 402 surrounding 3D object 302 is the selected UI. The enlargement/reduction operation includes an enlargement operation and a reduction operation.

As in the rotational operation described referring to FIG. 8, the second operation (in this case, an operation of holding the microframe IU 402) is performed by the user, before the enlargement/reduction operation (third operation) is performed by the user. Accordingly, if the enlargement/reduction operation is performed, it is assumed that the hands of the user are in positions 701 and 702 corresponding to positions on (the rectangular shape of) the microframe UI 402 that substantially oppose each other with the forming surface of the microframe UI 402, as is shown in the upper portion of FIG. 9.

In this case, it is assumed that the operation detector 202 detects the enlargement operation when detecting that one (for example, the left hand) of the user's hands has been moved in a direction substantially parallel to the forming surface of the microframe UI 402 (for example, in the left direction), and the other hand (for example, the right hand) of the user's hands has been moved in a direction (for example, in the right direction) opposite to the first-mentioned direction (more specifically, when detecting changes in the positions of the user's hands corresponding to the above-mentioned movements of the left and right hands). Conceptually, if such an operation as horizontally stretching (the rectangular shape of) the microframe UI 402 (that is, enlarging the microframe UI 402) is detected, the enlargement operation is detected.

If such an enlargement operation is detected, 3D object 302 and the microframe UI 402 can be enlarged with a ratio corresponding to changes in the positions of the user's hands caused by the enlargement operation to be displayed, as is shown in the lower portion of FIG. 9.

FIG. 9 shows the enlargement operation. Similarly, if it is detected that the user's left hand has been moved rightward and the user's right hand has been moved leftward, the operation detector 202 detects the reducing operation. In other words, if a user operation of horizontally reducing the microframe UI 402 is detected, the reducing operation is detected.

If such a reducing operation is detected, 3D object 302 and the microframe UI 402 can be reduced with a ratio corresponding to changes in the positions of the user's hands caused by the reducing operation to be displayed.

Although FIG. 9 is directed to the case where the user holds positions 701 and 702 on the microframe UI 402, using both hands, the positions in which the user holds the microframe are not limited to positions on the left and right sides of the microframe UI 402. They may be positions on the upper and lower sides of the same. That is, even if, for example, such a user operation (enlargement/reduction operation) of vertically enlarging (or vertically reducing) the microframe UI 402 has been detected, with the upper and lower sides of the microframe UI 402 held by the user, 3D object 302 and the microframe UI 402 can be enlarged (or reduced) to be displayed.

It is sufficient if the user's hands are in positions where changes in the user's hands can be detected for detecting the above-described enlargement/reduction operation. For instance, the positions of the user's hands are not limited to the positions that oppose each other with the forming surface of the microframe 402 interposed therebetween.

Although FIG. 9 is directed to the case where the selected UI is the microframe UI 401, the enlargement/reduction operation can be also performed if the selected UI is the macroframe UI 401. In other words, 3D objects 301 to 303 and the macroframe UI 401 (namely, the entire space defined by the rectangular shape of the macroframe UI 401) can be enlarged or reduced by the enlargement/reduction operation.

Further, in the embodiment, the rotational operation and the enlargement/reduction operation are detected if the user holds a selected UI with both hands. However, the embodiment may be modified such that if the user performs such an operation as holding (an arbitrary position on) the selected UI, with one hand, a different operation is detected.

More specifically, it is assumed that the user holds, using their one hand, position 801 on the right side of the microframe UI 402 (selected UI), as is shown in, for example, the upper portion of FIG. 10. It is also assumed that the microframe UI 402 surrounds 3D object 302.

In this case, when detecting that, for example, the user's right hand has been moved substantially parallel to the forming surface of the microframe UI 402 (for example, horizontally or vertically) (more specifically, when detecting a change in the position of the user's right hand corresponding to the movement of the right hand), the operation detector 202 is assumed to detect an operation of moving 3D object 302 and the microframe UI 402 (hereinafter, referred to as a moving operation).

If such a moving operation has been detected, 3D object 302 and the microframe UI 402 can be moved in accordance with the change in the position of the user's right hand due to the moving operation to be displayed.

As described above, the embodiment is directed to the case where the user horizontally or vertically moves the microframe UI 402, using their one hand. However, if, for example, such an operation as moving the microframe UI 402 backward or forward (closer to or away from the user) is performed, 3D object 302 and the microframe UI 402 may be rotated about the aforementioned center of rotation to be displayed.

Moreover, although FIG. 10 is directed to the case where the selected UI is the microframe UI 402, the same moving operation as the above can be performed if the selected UI is the macroframe UI 401. In other words, the moving operation can move 3D objects 301 to 303 and the macroframe UI 401 (namely, the entire space defined by the rectangular shape of the macroframe UI 401).

In the above-described embodiment, if a 3D object (first 3D object) has been selected from a plurality of 3D objects displayed on the 3D display 12A, a rectangular microframe UI (first user interface) surrounding this 3D object is stereoscopically displayed on the 3D display, and the 3D object and the microframe UI are rotated through an angle (first angle) corresponding to changes in the positions of the user's hands that occur when the microframe UI is displayed. Further, if a plurality of 3D objects (first and second 3D objects) have been selected, the rectangular macroframe UI (second user interface) surrounding the 3D objects is stereoscopically displayed on the 3D display, and the 3D objects and the macroframe UI are rotated through an angle (second angle) corresponding to changes in the positions of the user's hands that occur when the macroframe UI is displayed.

More specifically, in the embodiment, after it is detected based on a captured image that the user's hands are in positions corresponding to positions on a rectangular microframe UI that oppose each other with the forming surface (first surface) of the microframe UI, if it is detected based on the captured image that one (first hand) of the user's hands is moved in a direction (first direction) not parallel to the forming surface of the microframe UI, and that the other hand (second hand) is moved in a direction (second direction) opposite to the first direction, a 3D object surrounded by the microframe UI and the microframe UI are rotated. Moreover, after it is detected based on a captured image that the user's hands are in positions corresponding to positions on a rectangular macroframe UI that oppose each other with the forming surface (second surface) of the macroframe UI, if it is detected based on the captured image that one of the user's hands is moved in a direction (third direction) not parallel to the forming surface of the macroframe UI, and that the other hand is moved in a direction (fourth direction) opposite to the third direction, 3D objects surrounded by the macroframe UI and the macroframe UI are rotated.

In the embodiment, the above-described structure enables the user to rotate a desired 3D object by moving both hands in association with the microframe or macroframe UI. Thus, the embodiment provides a user interface capable of intuitively, intelligibly and easily rotating 3D objects. Further, since an operation of rotating a 3D object is performed on a rectangular UI (a microframe UI or the macroframe UI) located around the 3D object, the 3D object as an operation target is not hidden by the hands of the user even during the operation, which enhances the visibility and operability of the operation target.

Furthermore, in the embodiment, a 3D object surrounded by a microframe UI is selected when it is detected, based on a captured image, that a user's hand is in a position (first position) for designating the 3D object. Moreover, a plurality of 3D objects surrounded by the macroframe UI are selected when it is detected based on a captured image that a user's hand is in a position (second position) for designating the 3D objects. In the embodiment, the above-described structure enables an operation target to be easily changed (switched) among a plurality of 3D objects displayed on the 3D display 12A.

Yet further, in the embodiment, after it is detected based on a captured image that the user's hands are in positions corresponding to positions on a rectangular microframe UI that oppose each other with the forming surface of the microframe UI, if it is detected based on the captured image that one of the user's hands is moved in a direction (first direction) substantially parallel to the forming surface of the microframe UI, and that the other hand is moved in a direction (second direction) opposite to the first direction, a 3D object surrounded by the microframe UI and the microframe UI are enlarged or reduced, based on changes in the positions of the user's hands. Also, after it is detected based on a captured image that the user's hands are in positions corresponding to positions on a rectangular macroframe UI that oppose each other with the forming surface of the macroframe UI, if it is detected based on the captured image that one of the user's hands is moved in a direction (third direction) substantially parallel to the forming surface of the macroframe UI, and that the other hand is moved in a direction (fourth direction) opposite to the third direction, a 3D object surrounded by the macroframe UI and the macroframe UI are enlarged or reduced, based on changes in the positions of the user's hands.

In the embodiment, the above-described structure enables a desired 3D object to be enlarged or reduced, as well as rotated, by causing the user to move both hands with respect to the microframe or macroframe UI.

Further, in the embodiment, axial lines (first axial lines) indicating a central point (center of rotation), about which a 3D object surrounded by a microframe UI and the microframe UI are rotated, are displayed in (the rectangular shape of) the microframe UI. Furthermore, axial lines (second axial lines) indicating a central point (center of rotation), about which a 3D object surrounded by a macroframe UI and the macroframe UI are rotated, are displayed in (the rectangular shape of) the macroframe UI. In the embodiment, this structure enables the center of rotation of a 3D object to be presented for the user to thereby support a user operation (3D operation).

In the embodiment, a 3D object or 3D objects surrounded by a microframe or macroframe UI are rotated about the center of rotation set as a default at the center of (the space defined by the rectangular shape of) the microframe or macroframe UI, as described above. The embodiment can be modified such that the center of rotation can be changed in accordance with a user operation.

Referring then to FIG. 11, a user operation for changing the center of rotation will be described in detail. Assume that the 3D display 12A displays a plurality of 3D objects 301 to 303 and the macroframe UI 401 as shown in the upper portion of FIG. 11. Assume also that the macroframe UI 401 displays vertical axial line 401a, horizontal axial line 401b, and depth-wise axial line 401c. In this case, the intersection of axial lines 401a to 401c represents the center of rotation.

When changing the center of rotation, the user firstly sets, for example, the electronic apparatus 10 in a mode for changing the center of rotation (hereinafter, referred to as a change mode), and then performs such an operation (hereinafter, referred to as a change operation) as designating the position of the center of rotation, using one of the hands (for example, an operation of pointing the position of the center of rotation).

Assuming that position 901 shown in the lower portion of FIG. 11 is designated by the change operation, position 901 is set as the center of rotation. Position (three-dimensional position) 901 designated by the change operation can be determined by the operation detector 202 based on a captured image, as described above. In this case, axial lines 401a to 401c are redrawn to intersect each other at (the position set as) the center of rotation 901.

If, for example, the above-mentioned rotation operation has been performed on the macroframe UI 401, 3D objects 301 to 303 and the macroframe UI 401 are rotated about the center of rotation 901.

The above-described structure capable of changing the position of the center of rotation enables the user to set the center of rotation in a desired position by an intuitive operation, which further enhances the operability.

As described above, in the change operation shown in FIG. 11, the position (three-dimensional position) designated by a user's hand can be set as the center of rotation. However, the designated position is determined based on a captured image. If a three-dimensional position is determined based on a captured image, an error may easily occur in the depth-wise direction (front-back direction), compared to the horizontal and vertical directions. Therefore, in the above-described change operation, the user may be unable to change the center of rotation to a desired position.

In view of the above, the embodiment has a structure capable of adjusting the depth-wise position of the center of rotation, using another operation. More specifically, it is assumed that in a state where the user holds positions 902 and 903 on the macroframe UI 401 shown in FIG. 12, using both hands, if a user operation of, for example, moving both hands toward the user has been detected, the center of rotation can be moved toward the user as shown in FIG. 13. FIG. 13 is a conceptual diagram (an overhead view) obtained when a plurality of 3D objects 301 to 303 and the macroframe UI 401 (namely, the macrospace defined by the macroframe UI 401) are viewed from above.

Although not illustrated, the center of rotation can also be moved depth-wise if, for example, such a user operation as moving both hands toward the display.

In the above-described structure, if, for example, the position of the center of rotation changed by the change operation is deviated, it can be adjusted to a desired position for the user.

If the position of the center of rotation is changed as described above, a numerical value, for example, indicating the changed position may be displayed to enable the user to grasp the changed position.

In the embodiment, a desired 3D object can be easily rotated, moved, enlarged and reduced and the center of rotation can be easily changed, by an intuitive operation, such as pulling, pushing, and position designation (pointing), as is described above.

It is described above that the center of rotation is changed when the change mode is set in the electronic apparatus 10. However, if the operation shown in FIG. 12 is performed where the change mode is not set, the format of display of a 3D object, such as the degree of spectroscopic display (i.e., the degree of projection), may be changed.

In the embodiment, if a plurality of cameras (for example, two-point cameras) are used as the camera 12B, the depth-wise positions of the user's hands can be recognized more accurately. In this case, operations intended by the user can be more accurately detected, whereby the operability of the apparatus is enhanced. In order to enhance the accuracy of recognition of the depth-wise position of each hand, a depth sensor 12C may be employed as well as the camera 12B, as is shown in FIG. 14.

Although the embodiment is directed to the case where the electronic apparatus 10 is realized as a notebook computer, the electronic apparatus 10 may be another type of electronic apparatus, such as a television or a computer monitor. It is sufficient if the electronic apparatus 10 can display 3D objects.

Each of the functions described in the embodiment may be realized by a circuit (processing circuit). The processing circuit includes, for example, a programmed hardware processor, such as a central processing unit (CPU). The processor executes a computer program (a group of commands) stored in a memory, to thereby realize the described functions. The processor may be a microprocessor including electrical circuits. The processing circuits include a digital signal processor (DSP), an application-specific integrated circuit (ASIC), a microcontroller, a controller, and other electronic circuit components. Each of the components other than the CPU described in the embodiment may also be realized by the processing circuits.

Moreover, since various types of processing in the embodiment can be realized by computer programs, the same advantages as those of the embodiment can be easily obtained simply by installing the computer programs to a computer through a computer-readable storage medium storing them and executing them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a display configured to display a three-dimensional object;
a camera configured to capture an image including hands of a user; and
a hardware processor configured to:
   display at least a first three-dimensional object and a second three-dimensional object on the display;
   spectroscopically display a first user interface of a rectangular shape surrounding the first three-dimensional object and the second three-dimensional object on the display, when a first operation is detected based on the captured image obtained from the camera and including a movement of the hands of the user;
   upon detecting, based on the captured image obtained from the camera and including a position and a size of the hands of the user, that one of the first three-dimensional object and the second three-dimensional object is selected, spectroscopically display a second user interface of a rectangular shape surrounding the selected three-dimensional object;
   generate a display to allow the user to recognize that one of the first user interface and the second user interface is a selected user interface (UI), when a second operation is detected based on the captured image obtained from the camera and including the hands of the user; and
   when a third operation for the selected UI is detected based on the captured image obtained from the camera and including changes in positions of the hands of the user, calculate a rotational angle, an enlargement ratio or a reduction ratio of a selected object included in the selected UI based on the changes, thereby deforming the selected object.

2. The electronic apparatus of claim 1, wherein
the hardware processor is configured to rotate the selected object corresponding to the first user interface and the first user interface at an angle corresponding to the changes, when it is detected, based on the captured image, that the user's hands are positioned in the first user interface, and then it is detected, based on the captured image, that a first hand of the user is moved in a first direction not parallel to the first surface and a second hand of the user is moved in a second direction opposite to the first direction; and
the hardware processor is configured to rotate the selected object corresponding to the second user interface and the second user interface at the angle corresponding to the changes, when it is detected, based on the captured image image, that the user's hands are positioned in the second user interface, and then it is detected, based on the captured image, that the first hand of the user is moved in a third direction not parallel to the second surface and the second hand of the user is moved in a fourth direction opposite to the third direction.

3. The electronic apparatus of claim 1, wherein
the hardware processor is configured to enlarge or reduce the selected object corresponding to the first user interface and the first user interface with a ratio corresponding to the changes, when it is detected, based on the captured image, that the user's hands are positioned in the first user interface, and then it is detected, based on the captured image, that a first hand of the user is moved in a first direction relative to the first surface and a second hand of the user is moved in a second direction opposite to the first direction; and
the hardware processor is configured to enlarge or reduce the selected object corresponding to the second user interface and the second user interface with the ratio corresponding to the changes, when it is detected, based on the captured image, that the user's hands are positioned in the second user interface, and then it is detected, based on the captured image, that the first hand of the user is moved in a third direction relative to the second surface and the second hand of the user is moved in a fourth direction opposite to the third direction.

4. The electronic apparatus of claim 2, wherein
the hardware processor is configured to display, in the rectangular shape of the first user interface, first axial lines indicating a center of rotation about which the selected object corresponding to the first user interface and the first user interface are rotated; and
the hardware processor is configured to display, in the rectangular shape of the second user interface, second axial lines indicating a center of rotation about which the selected object corresponding to the second user interface and the second user interface are rotated.

5. The electronic apparatus of claim 1, wherein if the user's hands are detected in the captured image, the hardware processor is configured to assume that the first and second three-dimensional objects are selected, and display the first user interface.

6. The electronic apparatus of claim 4, wherein the hardware processor is configured to change a position of the center of rotation, based on a position in the rectangular shape of the first user interface designated by a hand of the user included in the captured image.

7. The electronic apparatus of claim 1, wherein the hardware processor comprises:
a module configured to display the first and second three-dimensional objects on the display;
a module configured to stereoscopically display, on the display, the first user interface of the rectangular shape surrounding the first three-dimensional object and the second three-dimensional object, when the first operation is detected based on the captured image obtained from the camera and including the movement of the hands of the user;
a module configured to, upon detecting, based on the captured image obtained from the camera and including the position and the size of the hands of the user, that one of the first three-dimensional object and the second three-dimensional object is selected, stereoscopically display, on the display, the second user interface of the rectangular shape surrounding the selected three-dimensional object;
a module configured to perform display to allow the user to recognize that one of the first user interface and the second user interface is the selected UI, when the second operation is detected based on the captured image obtained from the camera and including the hands of the user; and
a module configured to, when the third operation for the selected UI is detected based on the captured image obtained from the camera and including the changes in the positions of the hands of the user, calculate the rotational angle, the enlargement ratio or the reduction ratio of the selected object included in the selected UI based on the changes, thereby deforming the selected object.

8. A method comprising:

displaying at least a first three-dimensional object and a second three-dimensional object on a display;

spectroscopically displaying a first user interface of a rectangular shape surrounding the first three-dimensional object and the second three-dimensional object on the display, when a first operation is detected based on a captured image obtained from a camera and including a movement of hands of a user;

upon detecting, based on the captured image obtained from the camera and including a position and a size of the hands of the user, that one of the first three dimensional object and the second three-dimensional object is selected, spectroscopically displaying a second user interface of a rectangular shape surrounding the selected three-dimensional object on the display;

performing display to allow the user to recognize that one of the first user interface and the second user interface is a selected user interface (UI), when a second operation is detected based on the captured image obtained from the camera and including the hands of the user; and when a third operation for the selected UI is detected based on the captured image obtained from the camera and including changes in positions of the hands of the user, calculating a rotational angle, an enlargement ratio or a reduction ratio of a selected object included in the selected UI based on the changes, thereby deforming the selected object.

9. The method of claim 8, further comprising:

rotating the selected object corresponding to the first user interface and the first user interface at an angle corresponding to the changes, when it is detected, based on the captured image, that the user's hands are positioned in the first user interface, and then it is detected, based on the captured image, that a first hand of the user is moved in a first direction not parallel to the first surface and a second hand of the user is moved in a second direction opposite to the first direction; and rotating the selected three-dimensional object corresponding to the second user interface and the second user interface at the angle corresponding to the changes, when it is detected, based on the captured image, that the user's hands are positioned in the second user interface, and then it is detected, based on the captured image, that the first hand of the user is moved in a third direction not parallel to the second surface and the second hand of the user is moved in a fourth direction opposite to the third direction.

10. The method of claim 8, further comprising:

enlarging or reducing the selected object corresponding to the first user interface and the first user interface with a ratio corresponding to the changes upon detecting, based on the captured image, that the user's hands are positioned in the first user interface, and then it is detected, based on the captured image, that a first hand of the user is moved in a first direction relative to the first surface and a second hand of the user is moved in a second direction opposite to the first direction; and enlarging or reducing the selected object corresponding to the second user interface and the second user interface with the ratio corresponding to the changes, when it is detected, based on the captured image, that the user's hands are positioned in the second interface, and then it is detected, based on the captured image, that the first hand of the user is moved in a third direction relative to the second surface and the second hand of the user is moved in a fourth direction opposite to the third direction.

11. The method of claim 9, further comprising:

displaying, in the rectangular shape of the first user interface, first axial lines indicating a center of rotation about which the selected object corresponding to the first user interface and the first user interface are rotated; and displaying, in the rectangular shape of the second user interface, second axial lines indicating a center of rotation about which the selected three-dimensional object corresponding to the second user interface and the second user interface are rotated.

12. The method of claim 8, wherein if the user's hands are detected in the captured image, it is assumed that the first and second three-dimensional objects are selected, and the first user interface is displayed.

13. The method of claim 11, wherein a position of the center of rotation is changed based on a position in the rectangular shape of the first user interface designated by a hand of the user included in the captured image.

* * * * *